Patented Mar. 24, 1931

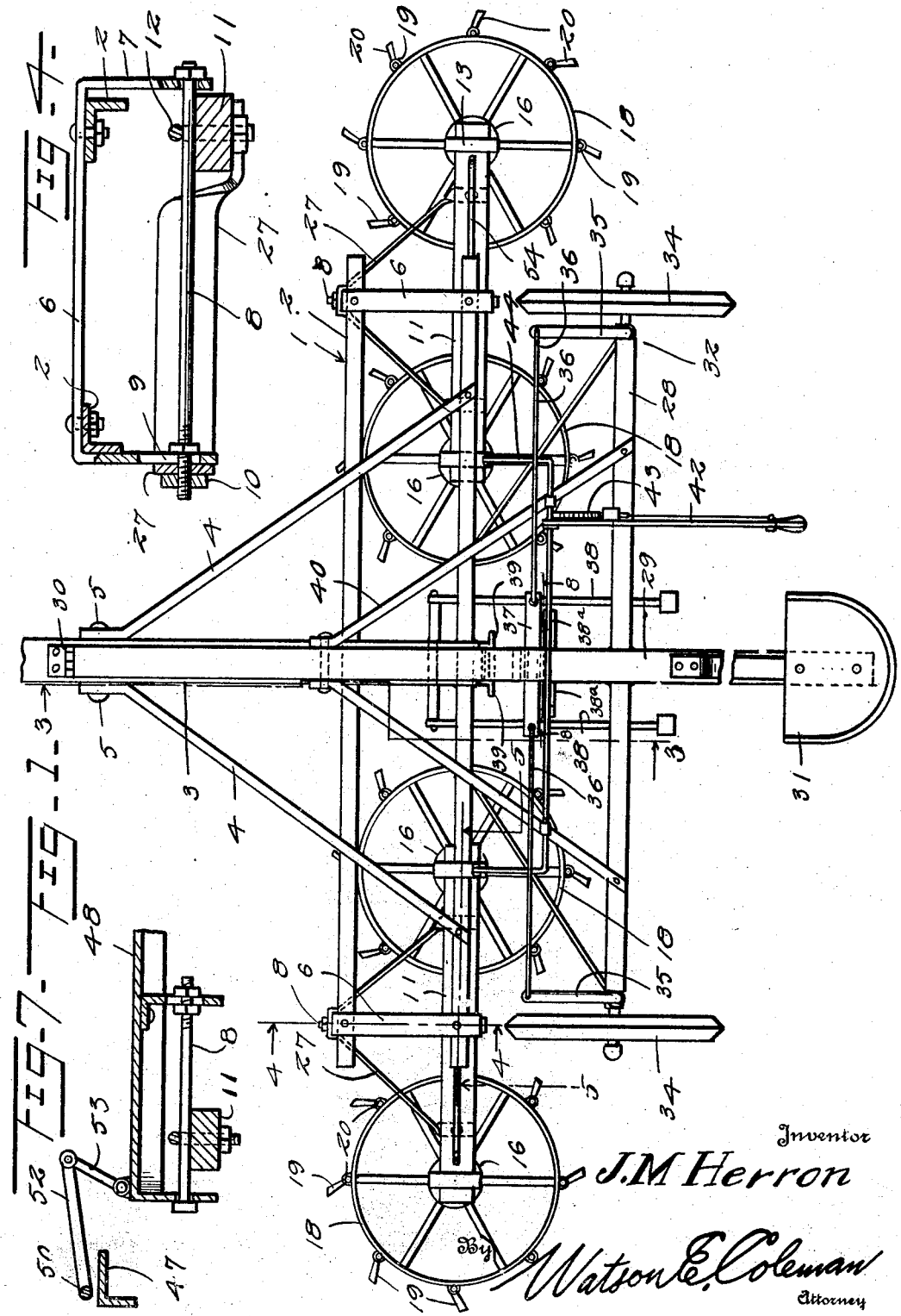

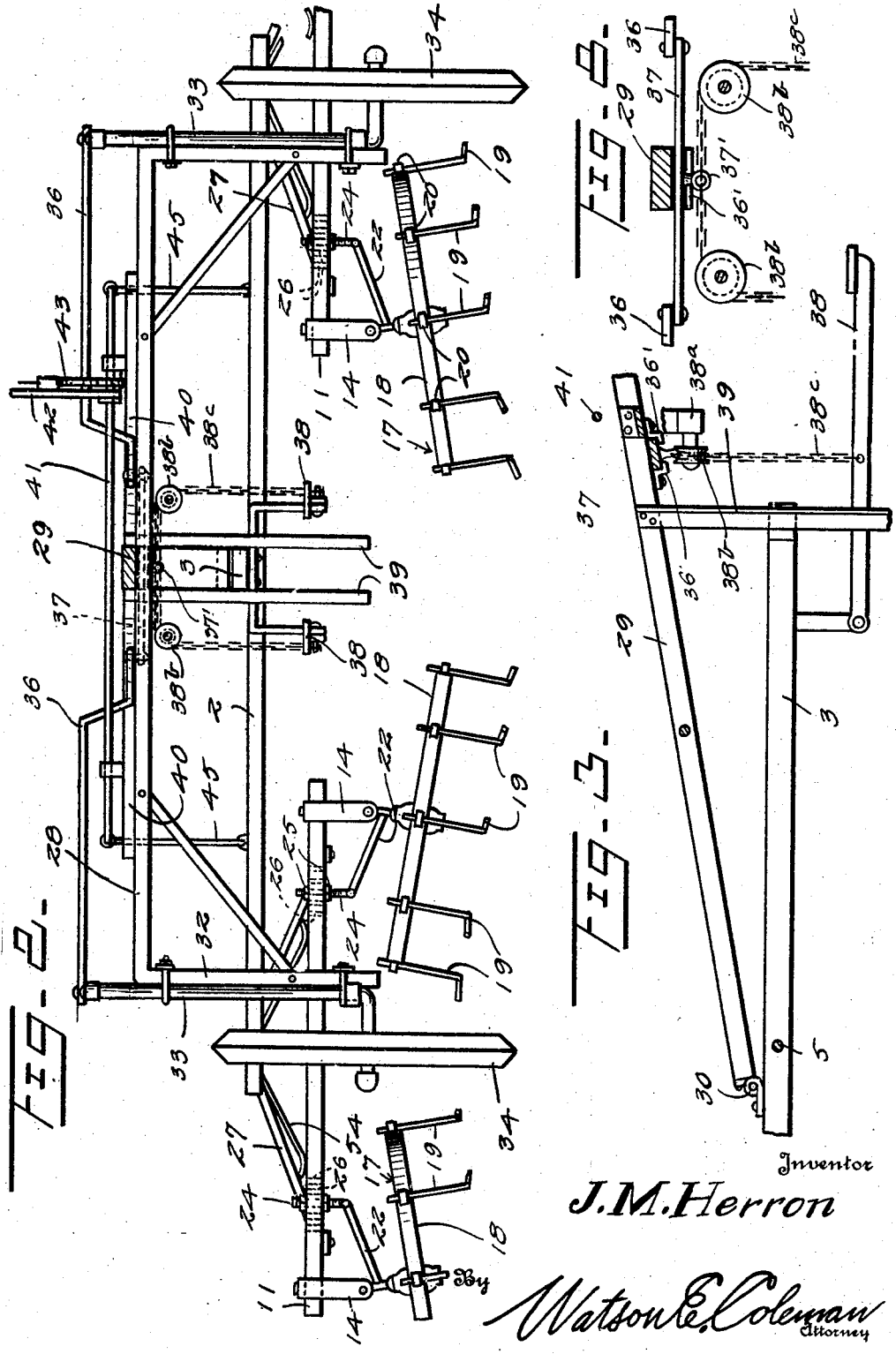

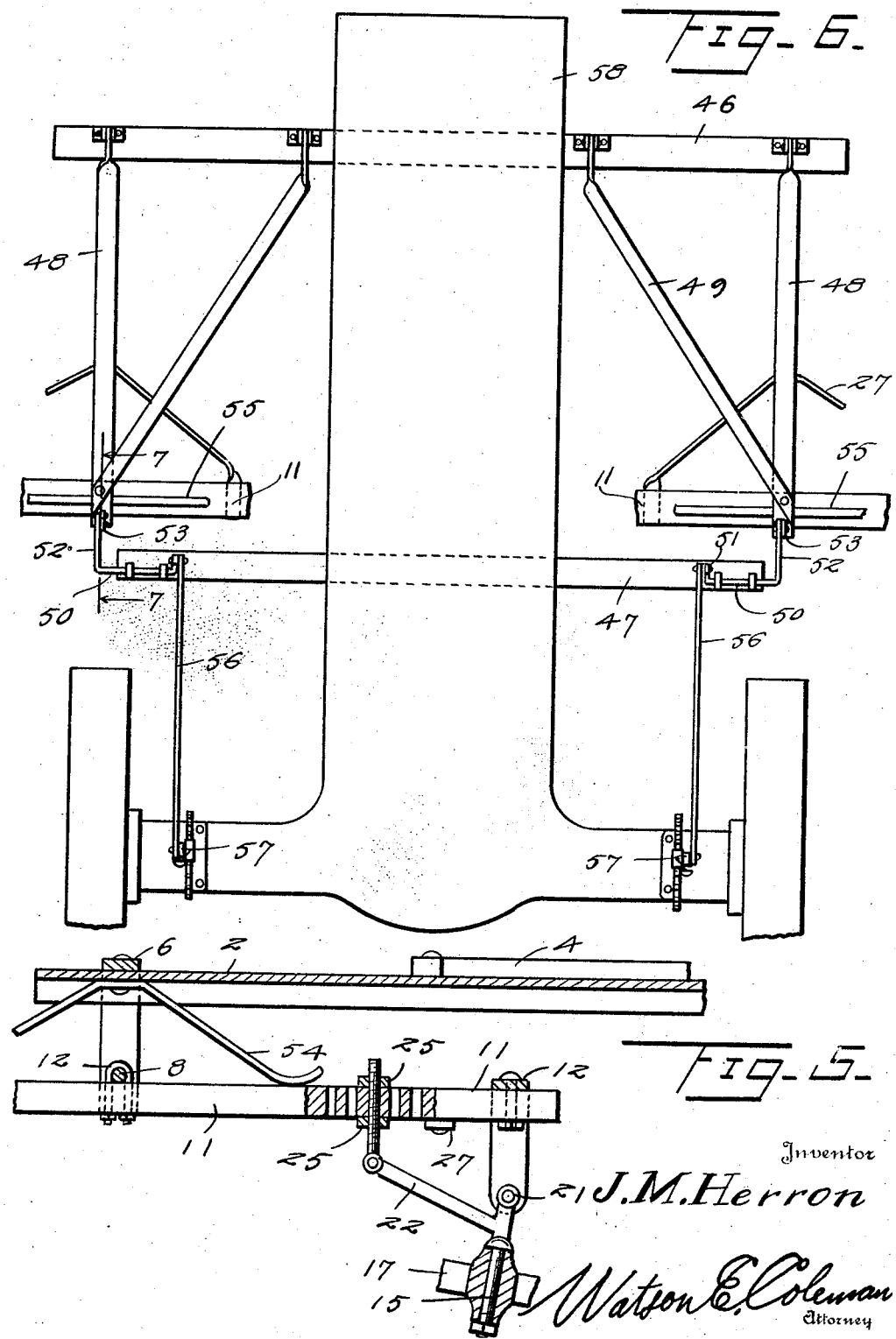

1,797,231

UNITED STATES PATENT OFFICE

JAMES M. HERRON, OF TAFT, TEXAS

COTTON-BLOCKING CULTIVATOR

Application filed December 10, 1929. Serial No. 413,060.

This invention relates to agricultural machines and pertains particularly to a cotton blocking cultivator.

The primary object of the present invention is to provide a cotton blocking cultivator with which four rows of cotton or other plants may be cultivated at a time to remove a certain number of the young plants quickly and efficiently and without disturbing the plants which are to be saved.

A further object of the invention is to provide a machine employing rotating gangs of hoes wherein the gangs may be adjusted to different angles and wherein the hoes of each gang may be individually adjusted as desired.

Still another object of the invention is to provide a cultivator employing rotating gangs of hoes each of which gangs may be so arranged as to rotate in a plane disposed at the most advantageous angle to the ground.

A still further object of the invention is to provide a cultivator employing gangs of hoes wherein all of the gangs may be shifted vertically as desired and wherein also certain oscillatory movement of the gangs is permitted for adjustment.

The invention will be best understood from a consideration of the following detailed description taken in connection with the accompanying drawings forming part of this specification, with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in top plan of the machine embodying the present invention.

Figure 2 is a rear elevational view.

Figure 3 is a sectional view thereof taken upon the line 3—3 of Figure 1.

Figure 4 is a sectional view taken upon the line 4—4 of Figure 1.

Figure 5 is a sectional view taken substantially upon the line 5—5 of Figure 1.

Figure 6 is a plan view of a tractor unit for the operation of the cotton chopper by motive power.

Figure 7 is a sectional view taken upon the line 7—7 of Figure 6.

Figure 8 is a sectional view take transversely of the machine upon the line 8—8 of Figure 1.

Referring more particularly to the drawings wherein like numerals of reference indicate corresponding parts throughout the several views, the numeral 1 indicates generally the frame of the cultivator which, as shown, consists of two spaced substantially parallel beams 2 which extend transversely of the machine, these beams preferably being of angle iron and secured midway between their ends to the rear end of a draft beam 3 beneath which they pass.

Angularly disposed brace beams 4 extend across the frame 1 adjacent each end and are secured to the beams 2 at their rear ends while the forward ends are secured to the draft beam 3 as indicated at 5.

Extending across and connecting the beams 2 at each end of the frame is an inverted substantially U-shaped beam 6, the ends 7 thereof extending downwardly below the beams 2 in the manner shown in Figure 4. Connecting the ends 7 of the beams 6 are bars 8 the forward end of each beam being provided with a vertical slot 9 through which the forward end of the adjacent bar passes, clamp nuts 10 being mounted upon the bar to secure the same in a desired position for the purpose hereinafter to be described. The other end of each of the bars 8 is only sufficiently loosely attached to the adjacent depending portion of the beam to permit vertical oscillation of the forward end thereof in the manner stated.

Extending transversely of the rear end of each of the bars 8 is a beam 11, the beam being engaged by the bar substantially midway between its ends and secured thereto by a U-bolt 12.

At each end of each of the beams 11 there is mounted an inverted substantially U-shaped hanger 13 between the depending portions 14 of which is pivotally suspended a hanging stub axle 15. Each of the stub axles 15 passes through the hub 16 of an earth working implement carrying wheel indicated generally by the numeral 17, the rim portion 18 of the wheel having secured at spaced intervals thereabout the clamp elements 20.

Each of the clamps 20 secures to the periphery of the wheel the shank of a hoe 19, the lower end or blade of which may be straight or turned to extend at an angle as shown. It will be readily seen that by loosening the clamps 19 the hoes may be adjusted vertically to arrange them in a position best suited for the conditions under which the machine is to be used.

Each of the beams 11 thus supports at each end a wheel carrying the gang of hoes which wheel may be oscillated about the point 21 to position the gang to rotate in a horizontal plane or in a plane disposed at an angle to the ground beneath.

In order to maintain the stub axle at any desired angle so that the wheel and gang of plows may be rotated in an inclined plane there is attached to the beam adjacent the other end a bar 22, the outer end of which is pivotally attached as at 23 to a screw 24 passing upwardly through the beam and carrying above and below the beam the lock nuts 25. A series of apertures 26 is provided so that the screw 24 may be disposed in any one of several different positions in the beam 11 to swing the attached stub axle to the desired position, to adapt the gang to rows of different widths.

Connecting each beam 11 with the forward end of the adjacent beam 6 is a brace arm 27. If desired these arms may be connected to form a V-shaped member having the apex positioned to receive the forward end of the beam 6, the free ends of the arms being attached in any suitable manner to the beam as shown.

In operation the two gangs of plows upon each of the beams 11 are disposed at opposed inclinations so that as the machine is drawn over the ground with a row of plants passing under the longitudinal center and another row passing at the outer side of each outer gang the lowest ones of the plows as the gangs revolve will cut into the ground and remove the undesired plants.

For the support and conveyance of the cultivator structure over the ground there is provided a carriage consisting of an inverted U-shaped axle beam 28 the central portion of which is secured to a center beam 29 the forward end of which is designed to overlie the draft beam 3.

The connection between the forward end of the beam 29 and the draft beam 3 is preferably pivotal as indicated at 30 so that the rear portion of the cultivator structure may be lifted when desired to remove the gangs from contact with the ground. The rear portion of the beam 29 may be employed for the support of an operator's seat 31.

Pivotally attached to each depending portion 32 of the axle 28 is a vertical axle 33 upon the lower end of which is mounted a wheel 34. Each of the vertical axles 33 has extending forwardly therefrom an arm 35 to which is attached one end of a link 36 which runs toward the center of the machine. Mounted in suitable supporting guides 36' upon the underside of the beam 29 is a transversely extending reciprocable plate or bar 37 to each end of which an end of a link 36 is attached. This bar has intermediate its ends a depending eye 37'.

Mounted at each end of a cross beam 38a is a pulley wheel 38b over each of which runs a chain 38c one end of each chain being attached to the eye 37' as shown in Figure 8.

Pivotally mounted beneath the bar 29 are foot levers 38 each of which has the other end of a chain attached thereto. With the construction just described it will be seen that by applying pressure to one or the other of the foot levers 38 the arms 35 of the axles 33 may be swung in a desired direction for guiding the machine.

Secured to the beam 29 is a pair of spaced depending guide arms 39 which extend downwardly on opposite sides of the beam 3.

Mounted to extend transversely of the brace arms 40 which connect the forward part of the beam 29 with the outer portions of the axle structure 28 is an oscillatory shaft 41 carrying a control lever 42 which is pivotally mounted above the shaft upon a toothed segment 43, the lever carrying the usual spring controlled latch member for engagement with this segment to maintain the shaft in any desired position. The outer ends of the shaft 41 are turned to provide forwardly extending arms 44 the free end of each of which is connected by a depending link 45 with an underlying portion of the frame 1. It will thus be seen that by oscillating the lever 42 the arms 44 will be raised or lowered to bring the beams 3 and 29 into substantially parallel relation to lift the gangs of hoes 20 from contact with the ground.

In order to adapt the present machine to use with a tractor there is provided a frame structure such as is illustrated in Figure 6 which frame consists of front and rear transverse beams 46 and 47, the beam 46 being bolted across the front portion of the tractor while the beam 47 is secured transversely of the tractor body adjacent the rear thereof. Extending rearwardly from each end of the beam 46 is a side beam 48, the connection between the beam 46 and the beams 48 being pivotal. A brace beam 49 connects each of the beams 48 at its rear end with the beam 46 at a point inwardly of the adjacent end, the connection between each of the beams 49 and the beam 46 also being pivotal.

At each end the beam 47 carries a short oscillatable shaft 50 the ends of which are turned to form the crank arms 51 and 52, the crank arms 52 being connected by a link 53 with the adjacent side beam 48.

Each of the side beams 48 has secured thereto one of the beams 11 in the manner shown, each of the axles carrying the gang of plows at each end as illustrated in Figures 1 and 2. The same brace arms 27 used for connecting the beams 11 with the frame 10 in the animal drawn form of the cultivator may be here employed for bracing the ends of the beams against the side beams 48 to which they are attached.

In order to prevent extreme oscillation of the beams 11 transversely of the structure the rear beam 2 of the frame 1 has secured thereto one end of a resilient bumper bar 54 and a pair of similar bumper bars 55 are attached to the beams 48 to extend laterally thereof over the adjacent beam. It will thus be seen that should be beams oscillate to an extreme extent they will come into contact with these bumper bars.

The crank arms 51 of each of the shafts 50 is connected by a rod 56 with a suitable control lever 57 which may be mounted upon the rear portion of the tractor 58 so that as will be seen upon oscillation of the levers 57 the crank arms 52 will be raised and will in turn raise the free rear ends of the beams 48 and 49 to lift the gangs of hoes free from contact with the ground.

From the foregoing description it will be readily seen that as the gangs of hoes pass over the ground each at one side of a row of plants the lower ones of each gang will be forced into the ground and will chop up any plants with which they come into contact. The sides of each of the plant rows can thus be trimmed up so that a straight row of selected plants will remain.

While as shown in Figure 5 an ordinary wheel hub has been shown mounted directly upon a stub axle it is of course to be understood that any suitable type of bearing may be interposed between the axle and the adjacent face of the hub as for example ball or the well known roller type of bearing.

Having thus described my invention, what I claim is:

1. A cotton blocking cultivator comprising a wheel supported structure, a beam carried thereby, a pair of gangs of earth working elements rotatably supported in spaced relation by said beam, the elements of each gang being disposed about and concentric with the rotary center thereof, and means for adjusting the gangs to alter the plane of rotation relative to the surface of the ground.

2. A cotton blocking cultivator comprising a wheel supported structure, a beam supported intermediate its ends on said structure, a pair of wheels supported beneath each end of said beam and adapted to rotate about a substantially vertical center, a plurality of earth working elements secured about the periphery of each wheel, and means for oscillating the support for each wheel to alter the plane of rotation thereof relative to the ground.

3. A cotton blocking cultivator comprising a wheel supported frame, a beam supported intermediate its ends upon said frame, a stub axle pivotally suspended from each end of said beam, a wheel carried by each stub axle, a plurality of earth working elements adjustably secured about the periphery of each wheel and depending therefrom for contact with the ground, and adjusting means for each of said stub axles whereby the plane of rotation of the wheel may be shifted and fixed relative to the ground.

4. A cotton blocking cultivator comprising a wheel supported frame, a beam supported intermediate its ends upon said frame, a stub axle pivotally suspended from each end of said beam, a wheel carried by each stub axle, a plurality of earth working elements adjustably secured about the periphery of each wheel and depending therefrom for contact with the ground, and adjusting means for each of said stub axles whereby the plane of rotation of the wheel may be shifted and fixed relative to the ground, said adjusting means comprising an arm secured to the stub axle and a threaded link designed to extend through an aperture in the adjacent beam for attachment thereto.

5. A cotton blocking cultivator comprising a wheel supported frame, a beam supported intermediate its ends upon said frame, a stub axle pivotally suspended from each end of said beam, a wheel carried by each stub axle, a plurality of earth working elements adjustably secured about the periphery of each wheel and depending therefrom for contact with the ground, adjusting means for each of said stub axles whereby the plane of rotation of the wheel may be shifted and fixed relative to the ground, and means for oscillating the wheels in a plane substantially parallel with the path of travel of the vehicle.

6. A cotton blocking cultivator attachment for tractors, comprising a pair of beams adapted to be secured transversely of the tractor and in spaced relation with one another, a pair of side beams each pivotally connected at one end to an end of the forward one of the first mentioned beams, an oscillatable shaft carried upon each end of the rear one of the first mentioned beams and having each end formed to provide a crank arm having connection with the adjacent side beam, an axle extending transversely of and secured to the rear end of each side beam, a pair of stub axles suspended from the ends of each of said axles, a wheel carried by each stub axle, earth working elements secured to the periphery of each wheel, and lever control means mounted upon the tractor and connecting with the other crank arm of each shaft for vertically shifting the rear axle supporting ends of the side beams.

7. A cotton blocking cultivator attachment for tractors, comprising a pair of beams adapted to be secured transversely of the tractor and in spaced relation with one another, a pair of side beams each pivotally connected at one end to an end of the forward one of the first mentioned beams, an oscellatable shaft carried upon each end of the rear one of the first mentioned beams and having each end formed to provide a crank arm having connection with the adjacent side beam, an axle extending transversely of and secured to the rear end of each side beam, a pair of stub axles suspended from the ends of each of said axles, a wheel carried by each stub axle, earth working elements secured to the periphery of each wheel, lever control means mounted upon the tractor and connecting with the other crank arm of each shaft for vertically shifting the rear axle supporting ends of the side beams, means carried by each side beam for limiting oscillatory movement of the adjacent axle, and means for adjusting said wheels to rotate in a predetermined plane relative to the earth.

8. A cotton blocking cultivator, comprising a wheel supported structure, an elongated body carried by said structure and disposed substantially parallel with the path of travel thereof, said body terminating at each end in a depending arm, a bar disposed longitudinally beneath said body and supported at its ends by said arms, a beam disposed transversely of and secured intermediate its ends to said bar, said bar being oscillatable, earth working elements suspended from each end of said beam, and means for adjustably securing said earth working elements in working position relative to the ground therebeneath.

9. A cotton blocking cultivator, comprising a wheel supported frame, a beam supported intermediate its ends by said frame for oscillation in a plane substantially at right angles to the path of travel of the cultivator, a stub axle pivotally connected to said beam at each end thereof, a plurality of earth working elements carried by said stub axle and rotatable thereabout, an arm connected at one end with each stub axle, and means for connecting the other end of each arm with the adjacent beam, said adjustable connection facilitating the holding of the stub axle in an adjusted position to which it may be swung upon its pivot.

In testimony whereof I hereunto affix my signature.

JAMES M. HERRON.